(12) United States Patent
Williams et al.

(10) Patent No.: US 12,477,321 B2
(45) Date of Patent: Nov. 18, 2025

(54) ENTERPRISE PROFILE ASSOCIATED WITH A SUBSCRIBER IDENTITY MODULE (SIM)

(71) Applicant: DISH Wireless L.L.C., Englewood, CO (US)

(72) Inventors: Stephen P. Williams, Evergreen, CO (US); Stacey Lynne Osborn, Arvada, CO (US)

(73) Assignee: DISH Wireless L.L.C., Englewood, CO (US)

( * ) Notice: Subject to any disclaimer, the term of this patent is extended or adjusted under 35 U.S.C. 154(b) by 300 days.

(21) Appl. No.: 17/986,218

(22) Filed: Nov. 14, 2022

(65) Prior Publication Data

US 2024/0163657 A1  May 16, 2024

(51) Int. Cl.
*H04W 8/20* (2009.01)

(52) U.S. Cl.
CPC ..................... *H04W 8/20* (2013.01)

(58) Field of Classification Search
CPC ....................................... H04W 8/20
USPC ....................................... 455/418
See application file for complete search history.

(56) References Cited

U.S. PATENT DOCUMENTS

| | | | |
|---|---|---|---|
| 7,715,822 B2 | 5/2010 | Semple et al. | |
| 8,996,002 B2 | 3/2015 | Rodgers et al. | |
| 10,313,855 B2 | 6/2019 | Dao et al. | |
| 10,476,671 B2 | 11/2019 | Park et al. | |
| 10,623,952 B2 | 4/2020 | Gao | |
| 10,959,087 B1 | 3/2021 | Chen et al. | |
| 2011/0269461 A1 | 11/2011 | Xu et al. | |
| 2015/0281964 A1 | 10/2015 | Seo et al. | |
| 2015/0349825 A1 | 12/2015 | Lee et al. | |
| 2017/0171742 A1 | 6/2017 | Yang | |
| 2018/0160294 A1 | 6/2018 | Lee et al. | |

(Continued)

FOREIGN PATENT DOCUMENTS

| | | |
|---|---|---|
| CN | 109379738 | 2/2019 |
| WO | WO 2022/147313 | 7/2022 |

OTHER PUBLICATIONS enterpriseappstoday.com [online], "30+ cell phones at Workplace Statistics and Facts 2022," Oct. 11, 2022, retrieved on Mar. 14, 2023, retrieved from URL<https://www.enterpriseappstoday.com/stats/cell-phones-at-workplace-statistics.html>, 10 pages.

(Continued)

*Primary Examiner* — Joel Ajayi
(74) *Attorney, Agent, or Firm* — Fish & Richardson P.C.

(57) ABSTRACT

Methods, systems, and apparatus, including computer programs encoded on computer storage media, for associating an enterprise profile with a SIM. One of the methods includes obtaining a first profile corresponding to policies associated with usage of the mobile device to access enterprise resources, wherein a first SIM is configured in accordance with a second profile that is different from the first profile. The method includes configuring a second SIM in accordance with the first profile such that data through the second SIM is configured to be routed in accordance with the policies. The method includes routing data through the second SIM in accordance with the policies to access at least a portion of the enterprise resources, and routing data through the first SIM independent of the policies.

18 Claims, 4 Drawing Sheets

(56) References Cited

U.S. PATENT DOCUMENTS

2020/0314629 A1* 10/2020 Kreishan .............. H04W 88/06
2021/0051467 A1    2/2021 Rogan

OTHER PUBLICATIONS samsung.com [online], "Smartphones and your employees: To BYOD or not to BYOD?" Apr. 18, 2022, retrieved on Mar. 14, 2023, retrieved from URL<https://insights.samsung.com/2022/04/18/smartphones-and-your-employees-to-byod-or-not-to-byod/>, 8 pages.
International Search Report and Written Opinion in International Appln. No. PCT/US2023/035710, mailed on Feb. 7, 2024, 21 pages.

* cited by examiner

ENTERPRISE PROFILE ASSOCIATED WITH A SUBSCRIBER IDENTITY MODULE (SIM)

BACKGROUND

Wireless mobility services provide employers with a certain level of security and control while allowing employees to use their own mobile devices for business purposes.

SUMMARY

In general, one aspect of the present disclosure can be embodied in methods that include obtaining, at a mobile device configured to support a first subscriber identity module (SIM) and a second SIM, a first profile corresponding to policies associated with usage of the mobile device to access enterprise resources, wherein the first SIM is configured in accordance with a second profile that is different from the first profile. The methods include configuring the second SIM in accordance with the first profile such that data through the second SIM is configured to be routed in accordance with the policies. The methods include routing data through the second SIM in accordance with the policies to access at least a portion of the enterprise resources, and routing data through the first SIM independent of the policies.

One aspect of the present disclosure can be embodied in a mobile device. The mobile device can include one or more processors and one or more non-transitory storage devices that can store instructions operable, when executed by the one or more processors, to cause the one or more processors to perform operations including obtaining a first profile corresponding to policies associated with usage of the mobile device to access enterprise resources, wherein a first SIM is configured in accordance with a second profile that is different from the first profile. The operations include configuring a second SIM in accordance with the first profile such that data through the second SIM is configured to be routed in accordance with the policies. The operations include routing data through the second SIM in accordance with the policies to access at least a portion of the enterprise resources, and routing data through the first SIM independent of the policies.

One aspect of the present disclosure can be embodied in a non-transitory computer storage medium of a mobile device encoded with instructions that, when executed by one or more processors of the mobile device, cause the one or more processors of the mobile device to perform operations including operations including obtaining a first profile corresponding to policies associated with usage of the mobile device to access enterprise resources, wherein a first SIM is configured in accordance with a second profile that is different from the first profile. The operations include configuring a second SIM in accordance with the first profile such that data through the second SIM is configured to be routed in accordance with the policies. The operations include routing data through the second SIM in accordance with the policies to access at least a portion of the enterprise resources, and routing data through the first SIM independent of the policies.

Each of the above aspects can include one or more of the following features.

In some embodiments, the first profile includes a SIM profile, and configuring the second SIM in accordance with the first profile includes connecting at least one enterprise application to the SIM profile.

In some embodiments, the first profile includes at least one enterprise application, and configuring the second SIM in accordance with the first profile includes launching the enterprise application on the mobile device, receiving user credentials associated with the enterprise resources, and configuring the second SIM using the user credentials.

In some embodiments, configuring the second SIM in accordance with the first profile includes initiating a communication between the at least one enterprise application and an application programming interface (API) associated with an embedded Universal Integrated Circuit Card (EUICC); and storing a SIM profile on the EUICC via the API.

In some embodiments, the policies associated with usage of the mobile device comprise an enterprise security policy and an enterprise routing policy.

In some embodiments, the enterprise routing policy routes enterprise data through a cellular network in a trusted list of networks associated with the first profile, wherein the enterprise data is routed using the second SIM.

In some embodiments, the enterprise routing policy prevents routing enterprise data through at least one WiFi network.

In some embodiments, enterprise security policy includes a data storage policy.

In some embodiments, the second profile is customizable by a user of the mobile device, and the first profile is not customizable by a user of the mobile device.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various embodiments and may result in one or more of the following advantages. SIM enabled profiles can allow for unified device management across wireless devices for enterprises who are interested in having greater autonomy and policy management and control of employees' personal wireless devices when used for work purposes, whether they are corporate or individual-liable devices. SIM enabled profiles can give enterprises full control, policy management, and enhanced cybersecurity over the device when it is used for work purposes (e.g., without running through cloud services). Costs (e.g., mobile service plan, device financing) can be divided between the employee and employer. SIM enabled profiles allow the enterprise to retain control over security policies. For example, access to documents can be limited and/or managed. SIM enabled profiles allow employees to access work email and view work documents on their device without giving up all of their privacy and control. Enterprises can choose the network service for work profiles, allowing the enterprises to control quality of service and quality of experience (e.g., the enterprise network service could provide higher bandwidth than personal network services) in order to increase the performance of enterprise applications.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Most employees associated with an enterprise typically have an existing mobile device for personal use. As a result, enterprises often prefer to not provide separate devices for employees to access enterprise resources. In addition, employees often prefer not having to carry additional devices. As a result, enterprises typically install applications on the employees' phones (and implement relevant policies) to allow them to access work resources through their personal devices. However, some employees may be resistant to installation of device management software on personal devices, for example, due to privacy concerns. For example, employees may not want their employer to monitor their device usage, or know their search history. The technology described in this document allows for partitioning of a device such that a work profile and a personal profile are serviced by dedicated SIMs (e.g., a combination of a physical SIM and an eSIM, or two physical SIMs) substantially independently. This in turn can allow for enterprises to securely manage enterprise applications and data without potential exposure to personal data and usage of employees. Further, because the partitioning is at a SIM level, secure routing of enterprise data can be ensured in some cases (e.g., by always routing data through trusted cellular networks and/or other trusted networks rather than through potentially unsafe/untrusted networks such as public Wi-Fi), thereby reducing the chances of data breaches and providing for highly secure communication systems. Further, employees are able to access both personal and enterprise data and applications through respective SIMs without the threat of personal data being compromised.

Wireless carriers provide mobility services to meet the needs of businesses. The existing solutions for managing enterprise usage of mobile devices often favor large enterprises. As a consequence, small to medium enterprises (SMB) may be underserved with respect to the current mobility needs. For example, some carriers may simply rewrap their consumer offers for the SMB customer. Mobile device management (MDM) platforms include security software that enables IT departments to implement policies that secure, monitor, and manage mobile devices. MDM can include an MDM agent on the device, and MDM servers which transmit policies to the agent. Enterprise mobility management (EMM) allows employees to use their own devices for enterprise purposes. EMM can include mobile information management, mobile application management, and mobile content management.

However, MDM and EMM systems use the same wireless networks (e.g., 4G, 4G LTE, 5G, WiFi) for both enterprise and personal usage of the device. These systems do not allow the enterprise to control the network connections. They can only affect the functioning of the applications the manager controls. For example, managers can control data storage and transmission within the partition, but may not have control over how the data is routed outside the partition (e.g., whether over a cellular network or WiFi).

Some reports state that less than a fifth of organizations provide wireless devices or service plans to employees (Smartphones and your employees: To BYOD or not to Byod? (2022) Samsung Business Insights. Available at: https://insights.samsung.com/2022/04/18/smartphones-and-your-employees-to-byod-or-not-to-byod). However, data indicates that over two thirds of companies reimburse workers for work-related use of their devices (Elad, B. (2022) 30+ cell phones at Workplace Statistics and facts 2022, Enterprise Apps Today. Available at: https://www.enterpriseappstoday.com/stats/cell-phones-at-workplace-statistics.html#:~:text=Approximately%2069%25%20of%20employers%20reimburse,than%20500%20workers%20is%20% 2455.45). Many companies are strongly invested in cloud-based productivity solutions (i.e. Google Workspace One) that can leverage employee devices while protecting the enterprise systems and data networks.

General Overview

This disclosure describes methods and systems for partitioning functionalities of a device for enterprise and personal usage all the way to the network connectivity layer by routing enterprise traffic through a dedicated enterprise subscriber identity module (SIM) that is different from the SIM used for servicing a personal profile on the device. In some implementations, embedded SIM (eSIM) capabilities can be utilized to deliver wireless services to enterprise customers for their employees (e.g., to provide SIM-based, enterprise policy management and control of wireless devices) while servicing personal profiles through physical SIMs on the respective devices. The management and control can run on the device instead of as a service on a server. Enterprises can be provided with the option to leverage employees' personal devices for work, but with a greater level of control and cybersecurity for the use of the devices for work purposes. The highly secure communication systems that may be realized by implementing the technology described herein can have various applications. For example, the technology described herein can allow for personal devices to be used in the medical industry, which has heightened requirements related to securing and transmitting data due to Health Insurance Portability and Accountability Act (HIPPA) provisions. Similarly, the technology described herein can provide for secure payment processing services for an enterprise by providing a secure network for the transfer of money and account information.

A SIM enabled profile can allow enterprises to meet security requirements without providing a separate phone to employees. In some embodiments, a partition between personal and business usage within a single device can spawn market solutions which explicitly address changing work patterns and needs of the modern workforce coupled with the continued and growing preference for the bring-your-own device (BYOD) paradigm in the enterprise market.

Figure 1:
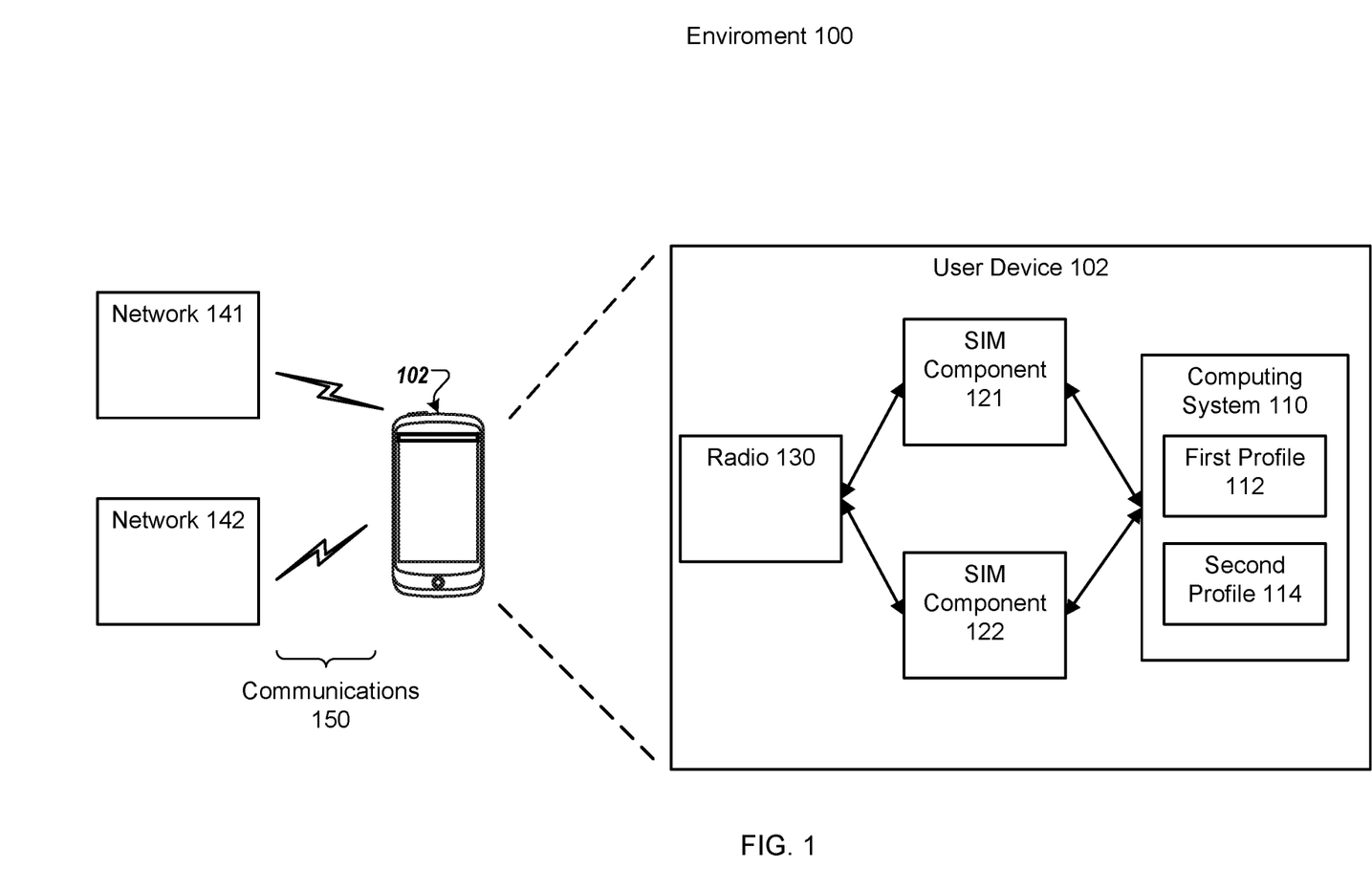
FIG. 1 is an example environment for associating an enterprise profile with a SIM.

FIG. 1 is an example environment 100 for associating an enterprise profile with a SIM. The environment 100 may include a user device 102, and networks 141 and 142. The user device 102 may be a mobile device (i.e., UE), and may send and receive data over the networks 141 and 142 through communications 150. The networks 141 and 142 may include a radio access network (RAN). The device 102 may connect with networks 141 and 142 using radio 130 (e.g., at least one radio). The user device 102 may also send and receive data over other networks (not shown), such as a local area network ("LAN"), wide area network ("WAN"), the Internet, or a combination thereof, which connect the user device 102 with other user devices and servers. The user device 102 may communicate with a single server computer or multiple server computers operating in conjunction with one another, including, for example, a set of remote computers deployed as a cloud computing service. The user device 102 may include computing system 110, SIM component 121, SIM component 122, and radio 130.

The computing system 110 may be implemented as computer programs on one or more computers in one or more locations, in which the systems, components, and techniques described in this specification are implemented. The computing system 110 can include one or more data processing apparatuses, can be implemented in code, or a combination of both. For instance, the computing system 110 can include one or more data processors and instructions that cause the one or more data processors to perform the operations discussed herein. The computing system 110 can include a first profile 112 and a second profile 114, described in more detail below.

The SIM component 121 may include a slot for a physical SIM (PSIM). A PSIM is a physical card which is inserted into a slot in the UE. The SIM component 122 is hardware which is separate from SIM component 121 and the PSIM. The SIM component 122 may conform to the machine-to-machine form factor (MFF2), and may include an embedded integrated circuit card identifier (EUICC) which acts as hybrid hardware. An embedded SIM (eSIM) profile can be downloaded onto the SIM component 122. An eSIM may act as a software SIM, including giving a phone number to the device. The EUICC allows over-the-air (OTA) provisioning of the eSIM profile.

The radio 130 may be used to send and receive communications between SIM component 121 and network 141, and SIM component 122 and network 142. The SIM components 121 and 122 may take turns using the radio 130. For example, SIM component 121 may access network 141 whenever possible, and SIM component 122 may have a higher priority and access network 142 when a transmission is pending.

The computing system 110 is configured to obtain the second profile 114 corresponding to policies associated with usage of the mobile device to access enterprise resources.

The SIM component 121 may be configured in accordance with the first profile 112 that is different from the second profile 114. The SIM component 121 may be used to connect to a service provider which the user subscribes to on a personal basis. In some embodiments, the first profile 112 may be customizable by a user of the mobile device. For example, the user may be able to customize requirements for accessing (e.g., unlocking) the first profile. In some examples, the user may install and/or uninstall applications associated with the first profile.

The computing system 110 may configure the SIM component 122 in accordance with the second profile such that data through the SIM component 122 is configured to be routed in accordance with the policies. The SIM component 122 may be used to connect to a service provider network which the enterprise subscribes to. In some embodiments, the second profile 114 may not be customizable by a user of the mobile device. For example, the policies corresponding to the second profile 114 may include predetermined access credentials (e.g., determined by the enterprise). In some embodiments, the second profile 114 may include at least one required application (e.g., which cannot be uninstalled) and/or at least one additional application provided by the enterprise (e.g., work email, work phone, work calendar) which the user may install and/or uninstall if at least one predetermined criteria is satisfied (e.g., the user authenticates the user device 102 with the enterprise).

In some embodiments, the second profile 114 can include a SIM profile (e.g., an eSIM profile). The computing system 110 may configure the SIM component 122 by connecting at least one enterprise application to the SIM profile. For example, the computing system 110 can first configure the SIM component 122 with the SIM profile, then connect the SIM profile to the enterprise application (e.g., a work profile). The SIM profile is a profile which allows the user device 102 to access a mobile network associated with the SIM profile. The enterprise application (e.g., enterprise profile, work profile) is an application (e.g., operating system, virtual box, package, partition, container) which manages access to and storage of enterprise resources (e.g., applications, services, products, data).

In some embodiments, the second profile 114 can include at least one enterprise application. The computing system 110 can instruct the enterprise application to configure the SIM component 122. The computing system 110 may configure the SIM component 122 by launching the enterprise application on the user device 102. The computing system 110 can receive user credentials (e.g., password, one time pin, biometric data) associated with the enterprise resources, and configure the second SIM using the user credentials. The computing system 110 may configure the SIM component 122 by initiating a communication between the at least one enterprise application and an application programming interface (API) associated with an embedded Universal Integrated Circuit Card (EUICC). The computing system 110 may store the SIM profile on the EUICC via the API.

The computing system 110 is configured to route data through the SIM component 122 in accordance with the policies to access at least a portion of the enterprise resources. In some embodiments, the policies associated with usage of the mobile device can include an enterprise security policy and an enterprise routing policy. The computing system 110 can use the enterprise routing policy to route enterprise data (e.g., network traffic associated with the at least one enterprise application) through a cellular network (rather than through a Wi-Fi network even if one is available) using the SIM component 122. In some embodiments, the enterprise routing policy can prevent the SIM component 122 from being used by the first profile 112. In some embodiments, the enterprise routing policy can prevent the SIM component 121 from being used by the second profile 114. In some embodiments, the enterprise routing policy skips routing enterprise data (e.g., network traffic associated with the at least one enterprise application) through at least one WiFi network. In such embodiments, the enterprise routing policy can actively prevent enterprise data from being routed over an available but untrusted network (e.g., a public Wi-Fi network) even if a cellular network in the trusted list of the second profile becomes unavailable. In some implementations, a custom device may be able to control the usage of WiFi. In some embodiments, the enterprise routing policy can include a list of trusted networks, e.g., enterprise WiFi networks.

In some embodiments, the enterprise security policy can include a data storage policy. The data storage policy can include encrypting any enterprise resources stored on the user device. The data storage policy can include a caching and/or data removal policy. For example, enterprise data can be deleted from the user device after a time period. The data storage policy can include periodically backing up any enterprise data to an enterprise server.

The computing system 110 is configured to route data through the SIM component 121 independent of the policies. Data transmitted and received by the first profile 112 does not need to meet the requirements of the policies. For example, the first profile can connect to any internet resources through a wireless network associated with SIM component 121 and/or a WiFi network. In some embodiments, the user may set the location where the data associated with the first profile 112 is stored. The user may determine security policies for the first profile 112.

In some embodiments, the computing system 110 can receive an update to the second profile 114 from at least one remote server (e.g., at least one enterprise server). The update can include new enterprise security policies and/or enterprise routing policies. The update can include restrictions from accessing enterprise resources and/or permission to access additional enterprise resources. The update can include installing additional enterprise application and/or uninstalling enterprise application. The update can include a group of changes determined by the enterprise and/or itemized changes which the user can accept and/or decline.

In some embodiments, the first profile 112 and the second profile 114 can have different graphical user interfaces (GUIs). In some embodiments, the at least one enterprise application is a full screen application and cannot be closed by the user. In some embodiments, the at least one enterprise application is active for a time period (e.g., length of time after activation, start and/or end timestamps). For example, the computing system 110 can prevent the user from accessing the first profile 112 during business hours. In some embodiments, the at least one enterprise application includes a lock screen. For example, the lock screen and/or unlock requirements for accessing the second profile 114 can be set by the enterprise.

Figure 2:
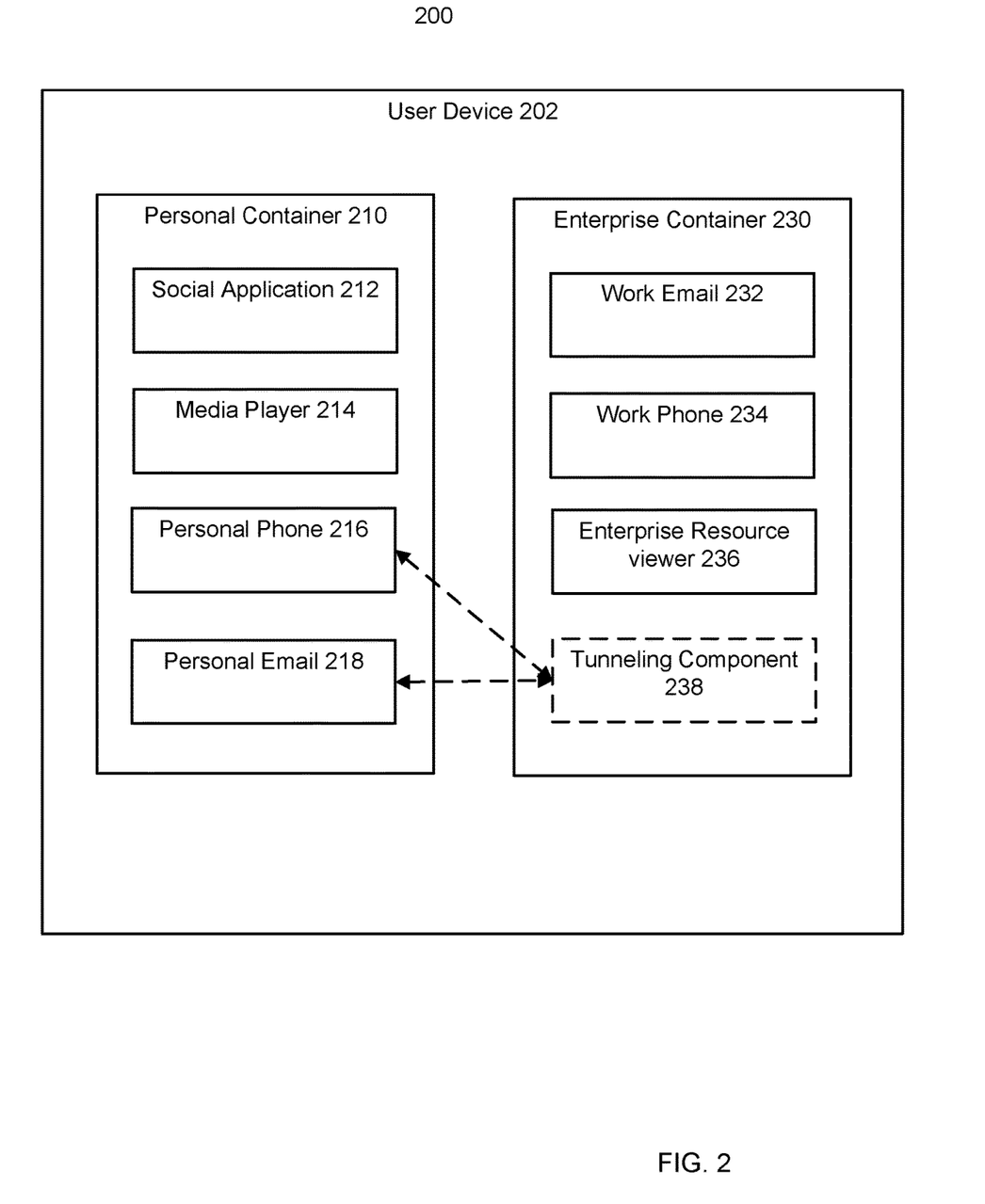
FIG. 2 is an example environment for partitioned personal and enterprise containers.

FIG. 2 is an example environment 200 for partitioned personal and enterprise containers. In some embodiments, the user device 202 is the same as or similar to user device 102 or computing system 110 of FIG. 1. The user device 202 may include personal container 210 and enterprise container 230.

The personal container 210 includes preinstalled applications (e.g., installed before the user purchased the device) and/or applications installed by the user. The applications include a social application 212, a media player 214, a personal phone 216, and a personal email 218. The social application 212 can be used for sharing content online with other users. The media player 214 can be used to display video and/or audio data stored on the device and/or streamed over a network. The personal phone 216 can be used to make and/or receive calls using a personal network service subscription associated with a personal phone number. In some embodiments, the personal applications can include web browsers, application stores, or camera applications.

The enterprise container 230 includes required applications (e.g., installed as part of the enterprise container 230) and/or enterprise applications installed by the user (e.g., through an enterprise software center with the enterprise container 230). The applications include a work email 232, a work phone 234, and an enterprise resource viewer 236. The applications may optionally include a tunneling component 238. The work email 232 can be used to access emails and/or calendar information associated with their enterprise for the user. The work phone 234 can be used to make and/or receive calls using an enterprise network service subscription associated with a work phone number for the user. The enterprise resource viewer 236 can be used to access secured enterprise data stored on the device and/or remotely view data stored on enterprise servers. The tunneling component 238 can allow the user to access enterprise approved personal applications while using the enterprise container 230. In some embodiments, the enterprise applications can include an application for installing and/or uninstalling enterprise approved applications.

Figure 3:
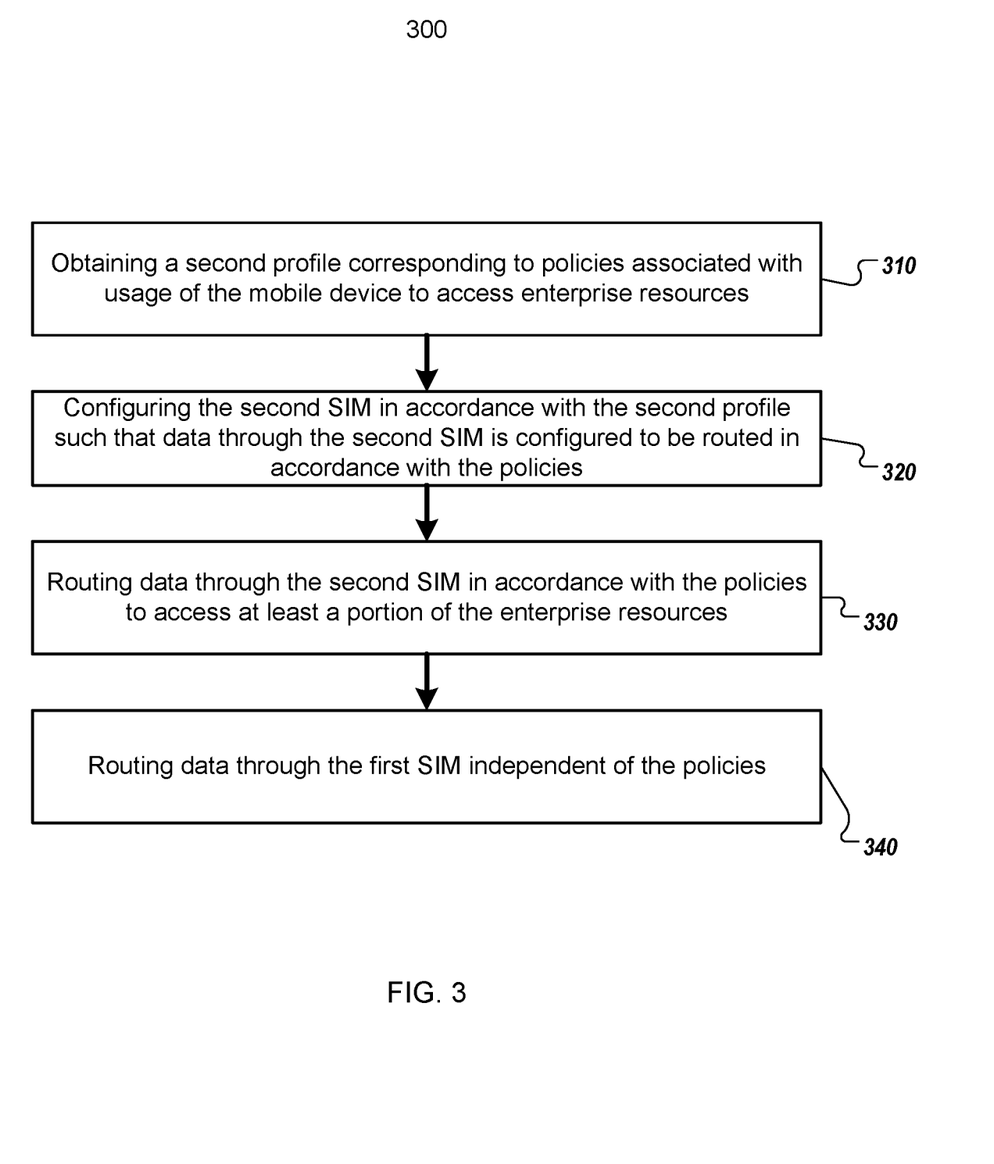
FIG. 3 is a flow diagram of an example process for SIM enabled profiles.

FIG. 3 is a flow diagram of an example process 300 for SIM enable profiles. For example, the process 300 can be used by the user device 102 from the environment 100 or the user device 202 from the environment 200. At block 310, a profile corresponding to policies associated with usage of a mobile device to access enterprise resources is obtained. The mobile device is configured to support a first subscriber identity module (SIM) and a second SIM. The first SIM is configured in accordance with a personal profile that is different from the profile. The personal profile may be customizable by a user of the mobile device, but the enterprise profile may not be customizable by the user.

At block 320, the second SIM is configured in accordance with the profile such that data through the second SIM is configured to be routed in accordance with the policies. The profile can include a SIM profile, and at least one enterprise application can be connected to the SIM profile. The profile can include at least one enterprise application, and the enterprise application can be launched on the mobile device to begin configuring the second SIM. User credentials associated with the enterprise resources can be received, and the second SIM can be configured using the user credentials.

Configuring the second SIM can include initiating a communication between the at least one enterprise application and an application programming interface (API) associated with an embedded Universal Integrated Circuit Card (EUICC). A SIM profile can be stored on the EUICC via the API. The enterprise application can be a full screen application and cannot be closed by the user. The enterprise application can include a lock screen. The enterprise application can be active for a time period.

At block 330, data is routed through the second SIM in accordance with the policies to access at least a portion of the enterprise resources. The policies associated with usage of the mobile device can include an enterprise security policy and an enterprise routing policy. The enterprise routing policy routes network traffic associated with at least one enterprise application through second SIM. The enterprise routing policy skips routing network traffic associated with the at least one enterprise application through at least one WiFi network. The enterprise security policy can include a data storage policy.

At block 340, data is route through the first SIM independent of the policies. Data transmitted and received by the personal profile through the first SIM does not need to meet the requirements of the policies.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 4:
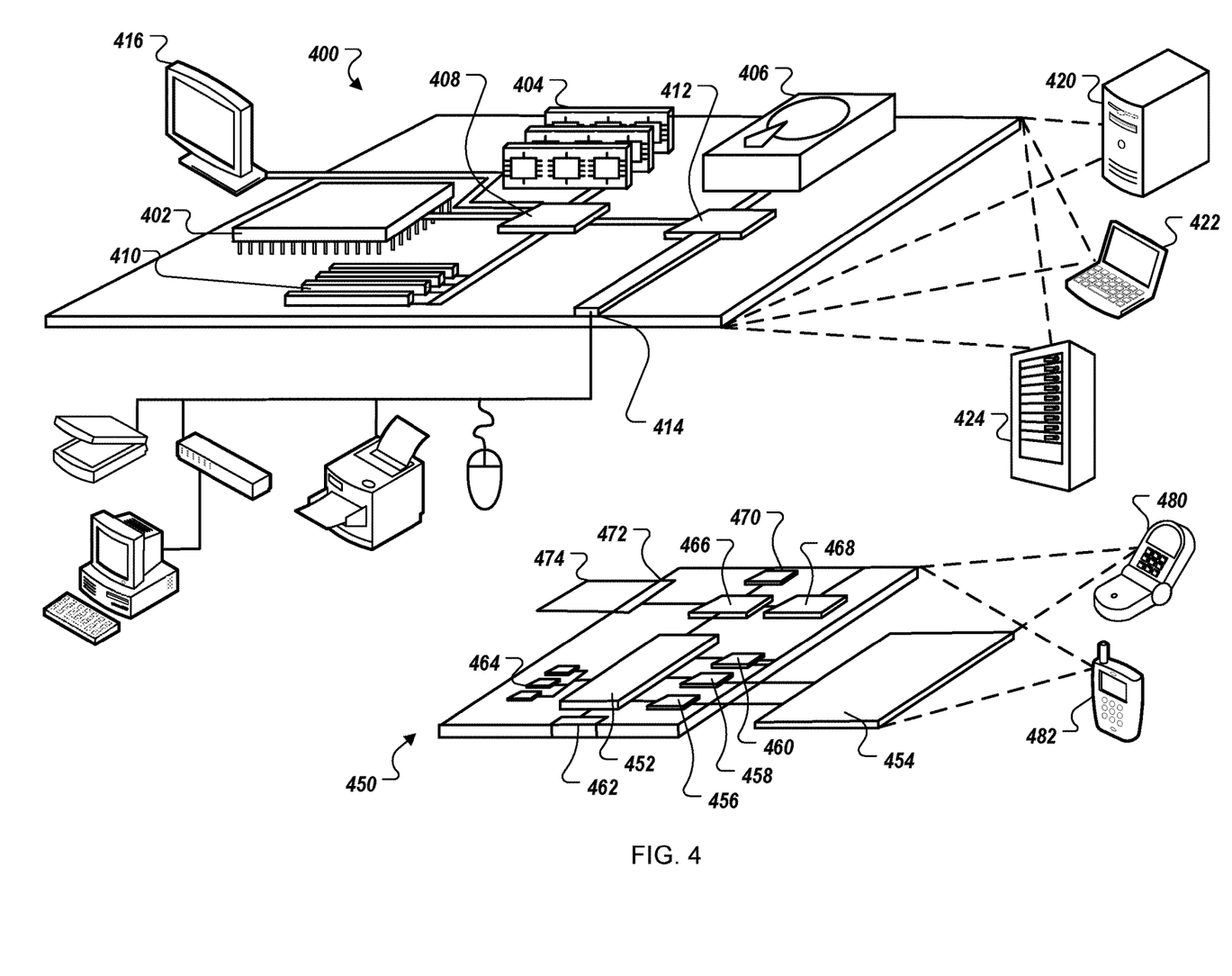
FIG. 4 is a block diagram of a computing system that can be used in connection with computer-implemented methods described in this specification.

FIG. 4 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 and/or the mobile computing device 450 can form at least a portion of the application installation environment described above.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 404. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented in the mobile device described with respect to FIGS. 1-3. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A method comprising:
   obtaining, from at least one server at one or more processing devices of a mobile device configured to support a first subscriber identity module (SIM) and a second SIM, a first profile corresponding to policies associated with usage of the mobile device to access enterprise resources, wherein the second SIM is configured in accordance with a second profile that is different from the first profile;
   configuring, by the one or more processing devices, the first SIM in accordance with the first profile such that data through the second first SIM is configured to be routed in accordance with the policies when the mobile device is used to access the enterprise resources, wherein configuring the first SIM in accordance with the first profile comprises:
   applying a routing policy that specifies (i) a trusted list of networks usable for accessing the enterprise resources through the first SIM, the trusted list of networks being associated with the first profile and (ii) at least one other network unusable for accessing the enterprise resources through the first SIM;
   routing data through the first SIM in accordance with the policies to access at least a portion of the enterprise resources; and
   routing data through the second SIM independent of the policies.

2. The method of claim 1, wherein:
   the first profile comprises a SIM profile, and
   configuring the first SIM in accordance with the first profile comprises:
      connecting at least one enterprise application to the SIM profile.

3. The method of claim 1, wherein:
   the first profile comprises at least one enterprise application;
   configuring the first SIM in accordance with the first profile comprises:
      launching the enterprise application on the mobile device;
      receiving user credentials associated with the enterprise resources; and
      configuring the first SIM using the user credentials.

4. The method of claim 3, wherein configuring the first SIM in accordance with the first profile comprises:
   initiating a communication between the at least one enterprise application and an application programming interface (API) associated with an embedded Universal Integrated Circuit Card (EUICC); and
   storing a SIM profile on the EUICC via the API.

5. The method of claim 1, wherein the policies associated with usage of the mobile device comprise an enterprise security policy.

6. The method of claim 1, wherein the routing policy pertains to routing enterprise data through a cellular network in the trusted list of networks associated with the first profile, wherein the enterprise data is routed using the first SIM.

7. The method of claim 5, wherein the routing policy pertains to preventing routing enterprise data through at least one WiFi network.

8. The method of claim 5, wherein the enterprise security policy comprises a data storage policy.

9. The method of claim 1, wherein the second profile is customizable by a user of the mobile device, and the first profile is not customizable by a user of the mobile device.

10. A mobile device comprising:
    memory; and
    one or more processing devices communicably coupled to the memory, the one or more processing devices configured to execute machine-readable instructions for performing operations comprising:
    obtaining, from at least one server at the mobile device configured to support a first subscriber identity module (SIM) and a second SIM, a first profile corresponding to policies associated with usage of the mobile device to access enterprise resources, wherein the second SIM is configured in accordance with a second profile that is different from the first profile;
    configuring the first SIM in accordance with the first profile such that data through the second first SIM is configured to be routed in accordance with the policies when the mobile device is used to access the enterprise resources, wherein configuring the first SIM in accordance with the first profile comprises:
    applying a routing policy that specifies (i) a trusted list of networks usable for accessing the enterprise resources through the first SIM, the trusted list of networks being associated with the first profile and (ii) at least one other network unusable for accessing the enterprise resources through the first SIM;
    routing data through the first SIM in accordance with the policies to access at least a portion of the enterprise resources; and
    routing data through the second SIM independent of the policies.

11. The mobile system of claim 10, wherein:
    the first profile comprises a SIM profile, and
    configuring the first SIM in accordance with the first profile comprises:
       connecting at least one enterprise application to the SIM profile.

12. The mobile device of claim 10, wherein:
    the first profile comprises at least one enterprise application;
    configuring the first SIM in accordance with the first profile comprises:
       launching the enterprise application on the mobile device;
       receiving user credentials associated with the enterprise resources; and
       configuring the first SIM using the user credentials.

13. The mobile device of claim 10, configuring the first SIM in accordance with the first profile comprises:
    initiating a communication between the at least one enterprise application and an application programming interface (API) associated with an embedded Universal Integrated Circuit Card (EUICC); and
    storing a SIM profile on the EUICC via the API.

14. The mobile device of claim 10, wherein the policies associated with usage of the mobile device comprise an enterprise security policy.

15. The mobile device of claim 14, wherein the routing policy pertains to routing enterprise data through a cellular network in the trusted list of networks associated with the first profile, wherein the enterprise data is routed using the first SIM.

16. The mobile device of claim 14, wherein the routing policy pertains to preventing routing enterprise data through at least one WiFi network.

17. The mobile device of claim 14, wherein the enterprise security policy comprises a data storage policy.

18. A non-transitory computer storage medium of a mobile device encoded with instructions that, when executed by one or more processors of the mobile device, cause the one or more processors of the mobile device to perform operations comprising:

obtaining, from at least one server at one or more processing devices of a mobile device configured to support a first subscriber identity module (SIM) and a second SIM, a first profile corresponding to policies associated with usage of the mobile device to access enterprise resources, wherein the second SIM is configured in accordance with a second profile that is different from the first profile;

configuring the first SIM in accordance with the first profile such that data through the second first SIM is configured to be routed in accordance with the policies when the mobile device is used to access the enterprise resources, wherein configuring the first SIM in accordance with the first profile comprises:

applying a routing policy that specifies (i) a trusted list of networks usable for accessing the enterprise resources through the first SIM, the trusted list of networks being associated with the first profile and (ii) at least one other network unusable for accessing the enterprise resources through the first SIM;

routing data through the first SIM in accordance with the policies to access at least a portion of the enterprise resources; and routing data through the second SIM independent of the policies.

* * * * *